March 13, 1962   KOJIRO YAMAOKA   3,024,773
COOLING SYSTEM FOR SMALLER INTERNAL COMBUSTION ENGINES
Filed April 8, 1960

3,024,773
COOLING SYSTEM FOR SMALLER INTERNAL COMBUSTION ENGINES
Kojiro Yamaoka, Nishinomiya-shi, Japan, assignor to Yasuhito Yamaoka, Kyoto, Japan
Filed Apr. 8, 1960, Ser. No. 21,009
Claims priority, application Japan Dec. 29, 1959
5 Claims. (Cl. 123—41.53)

In recent years, smaller horizontal internal combustion engines of the evaporative cooling type, which were formerly almost exclusively for land use, have come to be employed frequently also for marine services. In case of marine use, however, the use of fresh water as a cooling medium in engines of the kind described is naturally subject to some limitations, while the use of sea water as a cooling medium in the evaporative cooling system causes segregation of salt due to the temperature involved, which is close to 100 degrees centigrade, and also causes the engine to be subjected to severe corrosion.

The present invention is intended to overcome such difficulties thereby to enable smaller horizontal internal combustion engines of the kind to be employed for marine services. To this end, according to the present invention, an extremely simplified cooling system is provided which utilizes sea water for cooling fresh water in a hopper having substantially the same size as that of the hopper in similar engines of the evaporative cooling type.

The present invention will now be described with reference to the accompanying drawing which illustrates one embodiment of the invention.

Figure 1:
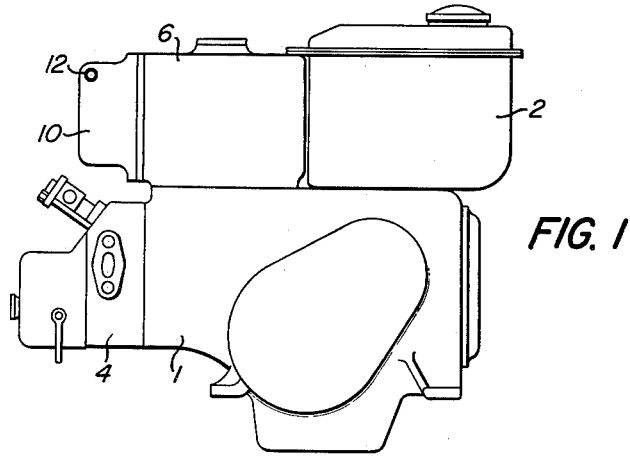
FIGURE 1 is a schematic side elevation illustrating the outline of a small internal combustion engine incorporating one embodiment of the present invention.
Figure 2:
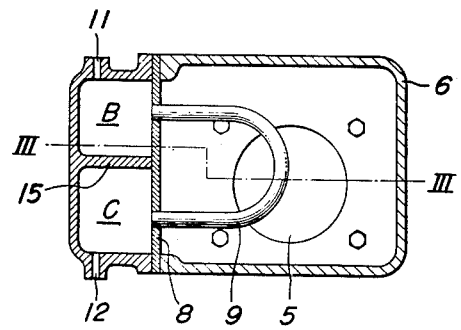
FIGURE 2 is a horizontal cross-sectional view of the cooling system incorporated in the engine shown in FIGURE 1.
Figure 3:
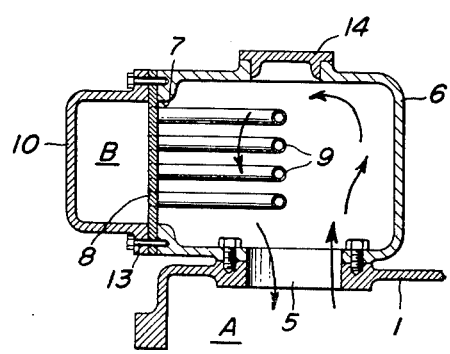
FIGURE 3 is a cross-sectional view substantially taken along the lines III—III in FIGURE 2.

Referring to the drawing, numeral 1 designates a cylinder block of the engine; 2 a fuel tank; 3 a hopper; and 4 a cylinder head. A fresh water tank 6 has an opening 5 through which the tank 6 communicates with the interior of a water jacket A on the cylinder block 1. The fresh water tank 6 also has an opening 7 at one end which is covered by a wall plate 8 which in turn has a sea water tank 10 attached thereto. It will be observed that the interior of the sea water tank 10 is divided into two chambers B and C by a partition wall 15, said chambers B and C having an inlet 11 and an outlet C, respectively, for sea water. A required number of cooling water tubes 9, extending through the fresh water tank 6, are each secured to the wall plate 8 so as to open at one end into the chamber B of the sea water tank 10 and at the other end into the chamber C·thereof. It will be seen that the sea water tank 10 is secured to the fresh water tank 6 through the wall plate 8 by means of clamping screw studs 13. Numeral 14 designates a top cover of the fresh water tank 6.

In operation of the cooling system arranged as described above, sea water is introduced through the inlet 11 into the chamber B by a cooling water pump attached to the engine for the purpose or by any other pumping means on board. The sea water from the chamber B flows through said respective cooling water tubes 9 to absorb heat contained in the fresh water in the tank 6. The heated sea water enters the chamber C and is discharged therefrom through the outlet 12 to the exterior of the engine.

In this manner, according to the present invention, sea water is passed through the cooling water tubes 9 extending through the water in the fresh water tank while absorbing heat of the fresh water, and such operation is continued during the time the engine is being run to effect cooling of the fresh water circulating through the water jacket. The fresh water is circulated in the tank 6 through opening 5. The fresh water in the tank 6 is cooled by the circulating sea waters. Since the temperature of the water in the jacket A is higher than that in the tank 6, the water is automatically circulated by thermal convection. It will be appreciated that the cooling system as illustrated is extremely high in cooling efficiency while employing a quite simple construction. It will further be appreciated that the invention provides a small horizontal internal combustion engine of the type described which has a cooling system of substantially the same size as that of the hopper used in the conventional evaporative cooling system and which also is lightweight, compact and economical in manufacture.

What is claimed is:

1. A heat exchanger for an engine which generates heat, said heat exchanger comprising: a housing above said engine, said housing being in communication with said engine and operatively disposed therewith for circulating a supply of fresh water therebetween, the fresh water absorbing the generated heat in the engine, a tank operatively disposed with respect to said housing, said tank being connected to a supply of sea water, said tank including a partition defining first and second chambers, at least one hollow tube interconnecting said chambers, said hollow tube being at least in part in said housing in heat exchangeable relation with the fresh water therein, and means for circulating said sea water through said tank and tube.

2. A heat exchanger as claimed in claim 1, wherein said housing is on said engine, said housing and engine being provided with aligned vertical apertures for the circulation of fresh water therethrough.

3. A heat exchanger as claimed in claim 1, wherein one of said chambers is provided with an inlet, the other of said chambers having an outlet, said means circulating the sea water between the inlet and outlet.

4. A heat exchanger as claimed in claim 1, comprising a plurality of spaced tubes.

5. A heat exchanger as claimed in claim 4, wherein said tubes are substantially horizontal.

References Cited in the file of this patent

UNITED STATES PATENTS

| 1,065,837 | Reichard | June 24, 1913 |
|---|---|---|
| 1,313,620 | Cammen | Aug. 19, 1919 |
| 1,432,518 | Armstrong | Oct. 17, 1922 |
| 2,377,028 | Nicholas | May 29, 1945 |
| 2,387,700 | Cribb | Oct. 23, 1945 |
| 2,428,373 | Lloyd | Oct. 7, 1947 |
| 2,466,525 | Wilson | Apr. 5, 1949 |

FOREIGN PATENTS

| 420,924 | France | Dec. 8, 1910 |